United States Patent [19]
Miyata et al.

[11] Patent Number: 6,070,325
[45] Date of Patent: Jun. 6, 2000

[54] METHOD FOR MEASURING A PRE-LOAD APPLIED TO A DOUBLE-ROW ROLLING BEARING

[75] Inventors: Yasuhiro Miyata, Yamatokoriyama; Nobuyoshi Murakami, Kashiwara, both of Japan

[73] Assignee: Koyo Seiko Co., Ltd., Osaka, Japan

[21] Appl. No.: 08/951,370

[22] Filed: Oct. 16, 1997

[30] Foreign Application Priority Data

Nov. 5, 1996 [JP] Japan ..................................... 8-310101

[51] Int. Cl.⁷ ................................................ B23P 15/00
[52] U.S. Cl. ..................... 29/898.09; 384/517; 384/500; 384/537; 29/407.05
[58] Field of Search ........................... 29/898.09, 407.05, 29/898.07, 898.062, 407.01; 384/517, 500, 450, 499, 501, 502, 504–506, 512, 519, 537, 543, 544, 563; 73/862.49, 818, 593, 862.59; 33/517, 701, 710

[56] References Cited

U.S. PATENT DOCUMENTS

| | | | |
|---|---|---|---|
| 5,497,559 | 3/1996 | Okumura et al. | 33/517 |
| 5,557,854 | 9/1996 | Fujioka | 33/517 |
| 5,597,965 | 1/1997 | Endo et al. | 73/862.49 |
| 5,620,263 | 4/1997 | Ohtsuki et al. | 384/517 |
| 5,670,874 | 9/1997 | Miyazaki et al. | 324/174 |
| 5,706,580 | 1/1998 | Ohtsuki et al. | 29/898.09 |
| 5,718,049 | 2/1998 | Ohtsuki et al. | 29/898.09 |

FOREIGN PATENT DOCUMENTS

| | | |
|---|---|---|
| 2286231 | 8/1995 | United Kingdom . |
| WO 95/12072 | 5/1995 | WIPO . |

*Primary Examiner*—S. Thomas Hughes
*Assistant Examiner*—Marc W. Butler
*Attorney, Agent, or Firm*—Thelen Reid & Priest

[57] ABSTRACT

In a double-row rolling bearing, there is a uniform relationship between a pre-load applied to the bearing and a pre-load gap formed by elastic transformation of rollers and some parts related to the rollers. Therefore, to measure the pre-load is equivalent to measure the pre-load gap. Then, a pre-load gap is measured at every row of the rollers, and measured values of the pre-load gaps are added together to thereby obtain an entire pre-load gap of the bearing.

1 Claim, 9 Drawing Sheets

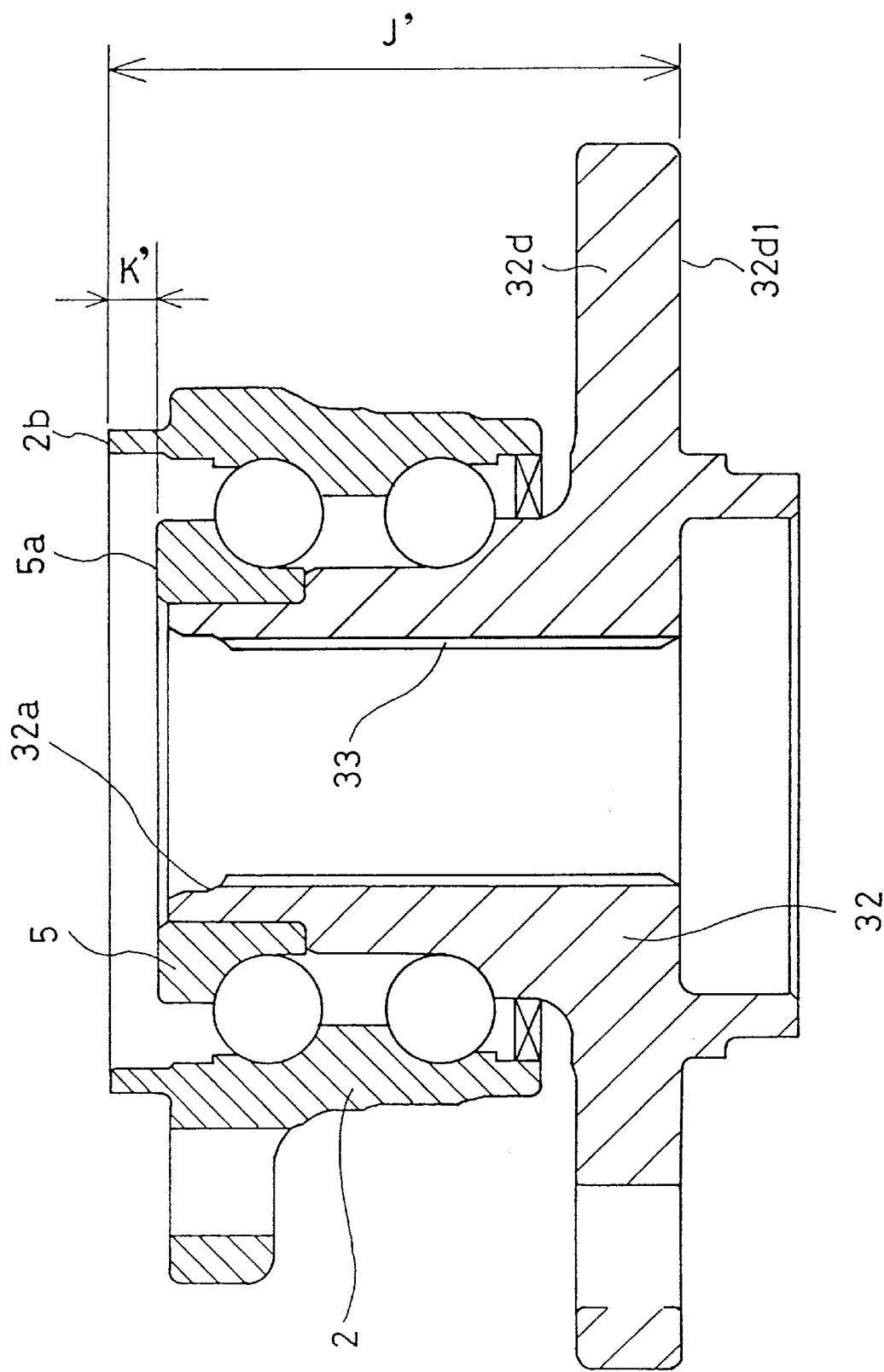

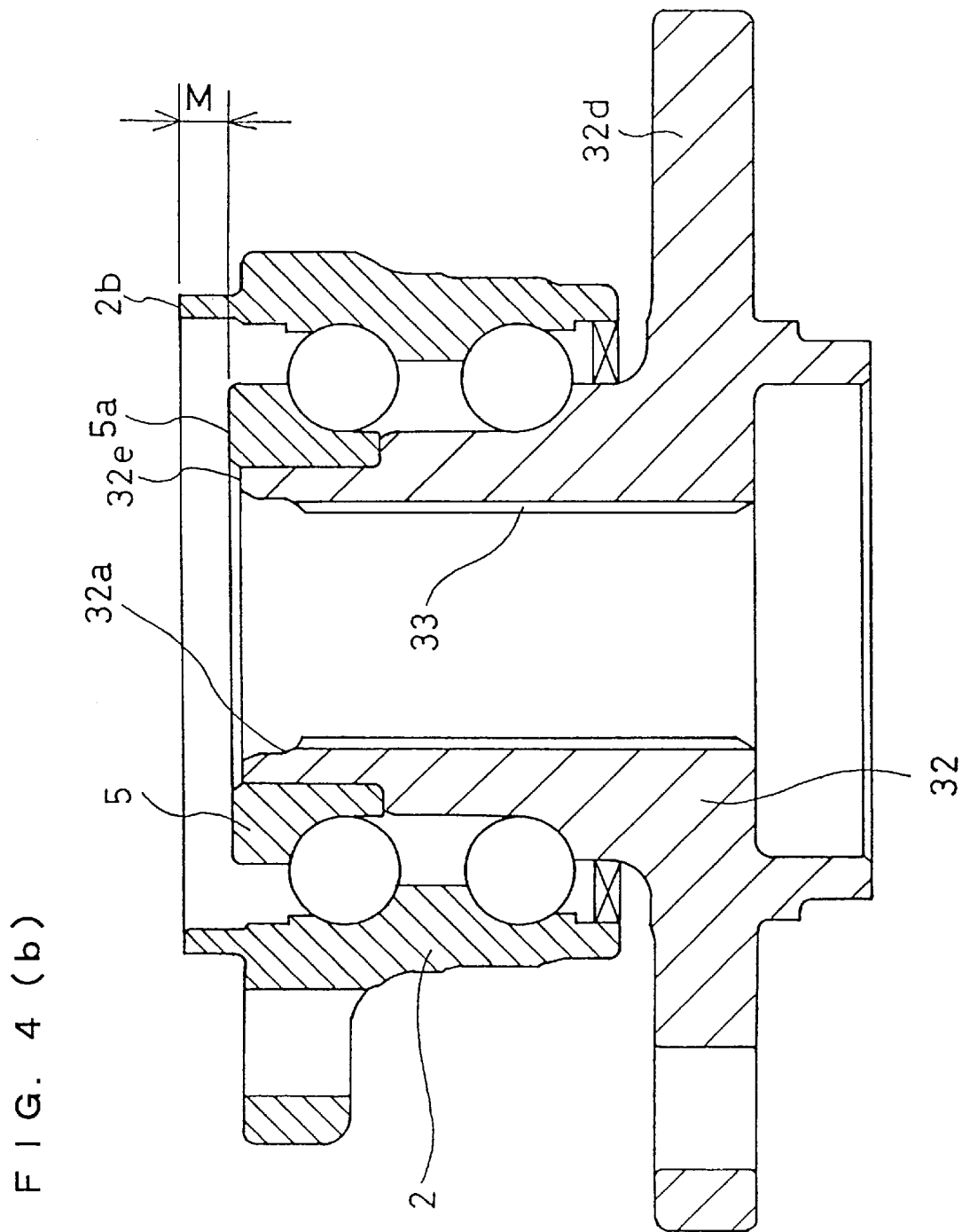

METHOD FOR MEASURING A PRE-LOAD APPLIED TO A DOUBLE-ROW ROLLING BEARING

FIELD OF THE INVENTION

The present invention relates to a method for measuring a pre-load applied to a double-row rolling bearing in which rollers are arranged in double rows in an axial direction of the bearing.

DESCRIPTION OF THE PRIOR ART

FIG. 5 is a cross-sectional view showing a hub unit 1 composed of a double-row rolling bearing. This hub unit 1 is an apparatus for connecting a wheel to a suspension system of an automobile. In FIG. 5, a flange member 2a of an outer ring or first bearing member 2, which is a stationary element of the bearing, is fixed to the suspension system (not shown). A spindle member 3a of the bearing, which is a movable element of the bearing, is inserted to an inner part of the outer ring 2. The spindle member 3a is rotatably held by plural rollers 4e forming an external (left side in the figure) annular row and plural rollers 4i forming an internal (right side in the figure) annular row. Hereinafter, the rollers 4e are referred to as external rollers, and the rollers 4i are referred to as internal rollers. A part of the spindle member 3a, which faces the internal rollers 4i, is formed into a cylindrical member 3b having a diameter smaller than the other part. An end part of the spindle member 3a is a male screw 3c. An inner ring or third bearing member 5 is fixed on around the cylindrical member 3b, and a nut 6 is tightened with the male screw 3c.

The external rollers 4e are held by the outer ring 2 and the spindle member 3a. The external rollers 4e are capable of making rolling motion in a circular path defined by a first outer-ring track 2e formed in an inner face part of the outer ring 2 and a first inner-ring track 3e formed in an outer face part of the spindle member 3a. Also, the internal rollers 4i are held by the outer ring 2 and the inner ring 5. The internal rollers 4i are capable of making rolling motion in a circular path defined by a second outer-ring track 2i formed in an inner face part of the outer ring 2 and a second inner-ring track 5i formed in an outer face part of the inner ring 5. The hub or second bearing member 3 has in its periphery a flange member 3d to which plural bolts 7 are fixed. A wheel (not shown) is fixed to the hub 3 with the bolts 7 and nuts (not shown), and the wheel rotates together with the hub 3. A seal 8, which is made of an elastic material, is provided on an inner circumference of an end part (left side) of the outer ring 2. The seal 8 is in contact with the rotating hub 3 to thereby prevent invasion of water or alien substance into the internal part of the outer ring 2.

Apart from the above-mentioned construction in which the bolts 7 are pre-fixed to the flange member 3d, the flange member 3d may have plural female screw portions to which bolts for fixing the wheel are inserted.

In the above-mentioned hub unit 1, the rollers 4e, 4i and the tracks 2e, 2i, 3e, 5i are finished to have a predetermined positional relationship between: (1) the external rollers 4e and the outer-ring track 2e; (2) the external rollers 4e and the inner-ring track 3e; (3) the internal rollers 4i and the outer-ring track 2i; (4) the internal rollers 4i and the inner-ring track 5i. Accordingly, when the nut 6 and the male screw 3c are tightened each other with a predetermined torque, a proper pre-load is applied to between the above-mentioned (1) to (4). If the pre-load is lower than the proper value, the bearing lacks of mechanical strength. In case the pre-load is remarkably lower than the proper value, the hub 3 causes vibration, resulting in loss of running stability of an automobile and generation of noise. If the pre-load is larger than the proper value, resistance of rotation increases, thereby spoiling a dynamic performance of the automobile and a fuel efficiency. Also, a lifetime of the hub unit 1 is shortened. To avoid these problems, it is necessary to confirm in a manufacturing process of the bearing whether the desirable pre-load is applied to the bearing.

Hereupon, it has been known that there is a uniform relationship between a pre-load applied to the bearing and a bearing torque of the bearing. Then, based on a bearing torque measured at the time when the hub 3 rotates relative to the outer ring 2, it could be confirmed whether the proper pre-load was applied to the bearing.

In case a bearing torque is measured by the above-mentioned method, however, a frictional resistance caused by the seal 8 is very much larger than a rotation resistance of the bearing. Moreover, the friction resistance takes values scattered greatly. Therefore, a measured value of the bearing torque contains a large error. It is thus impossible to correctly measure the pre-load, and it is difficult to find a bearing which is not impressed with the proper pre-load.

OBJECT AND SUMMARY OF THE INVENTION

An object of the present invention is to offer a method for measuring a pre-load applied to the bearing to thereby correctly inspect the suitability of pre-load in the bearing.

There is a uniform relationship between a pre-load applied to the bearing and a pre-load gap which is a negative "gap" formed by elastic transformation of rollers in the bearing and some parts related to the rollers when a state of free of pre-load turns to a state of pre-load. Therefore, to measure a pre-load is equivalent to measure a pre-load gap. It is therefore possible to check the suitability of pre-load by measuring the pre-load gap.

For use with a rolling bearing comprising plural rollers arranged in a first row and plural rollers arranged in a second row so as to form a double row of rollers, first, second, and third bearing members, first and second tracks formed respectively in the first and second bearing members so as to define a first path for the first row of plural rollers, and third and fourth tracks formed respectively in the first and third bearing members so as to define a second path for the second row of plural rollers, with the first and second paths forming a double row of tracks, a method for measuring a pre-load applied to the rolling bearing by measuring a pre-load gap in the bearing, the invention is a method comprising the steps of:

measuring a first pre-load gap for the first row of plural rollers and the first path, the first pre-load gap being defined by a variation in distance between the first and second bearing members before and after applying the pre-load to the bearing;

measuring a second pre-load gap for the second row of plural rollers and the second path, the second pre-load gap being defined by a variation in distance between the first and third bearing members before and after applying the pre-load to the bearing; and adding the first pre-load gap and the second pre-load gap together to thereby obtain an entire pre-load gap of the bearing.

According to the above-mentioned method, by adding up the pre-load gap measured at every row of the rollers, a correct pre-load gap of whole of the bearing is obtained. The pre-load gap is an elastic transformation generated responsive to the pre-load applied. To measure the correct pre-load gap is equivalent to measure the correct pre-load. Accordingly, based on the measured value of the pre-load gap, it can be correctly inspected whether proper pre-load is applied to the bearing.

Further, the above-mentioned method may be as follows:

a pre-load gap is measured plural times by rotating a movable element of the bearing with a predetermined angle relative to a stationary element of the bearing, and the first pre-load gap and the second pre-load gap are obtained from a mean value of measured values of the pre-load gap.

According to the method including the above procedure, even if there is eccentricity between an axial direction of the movable elements and an axial direction of the stationary elements, it is possible to reduce an error by taking a mean value of plural measured values, and thereby a correct measured value is obtained.

DESCRIPTION OF THE PREFERRED EMBODIMENTS

Hereafter, preferred embodiments of the present invention will be described with reference to the accompanying drawings.

Figure 5:
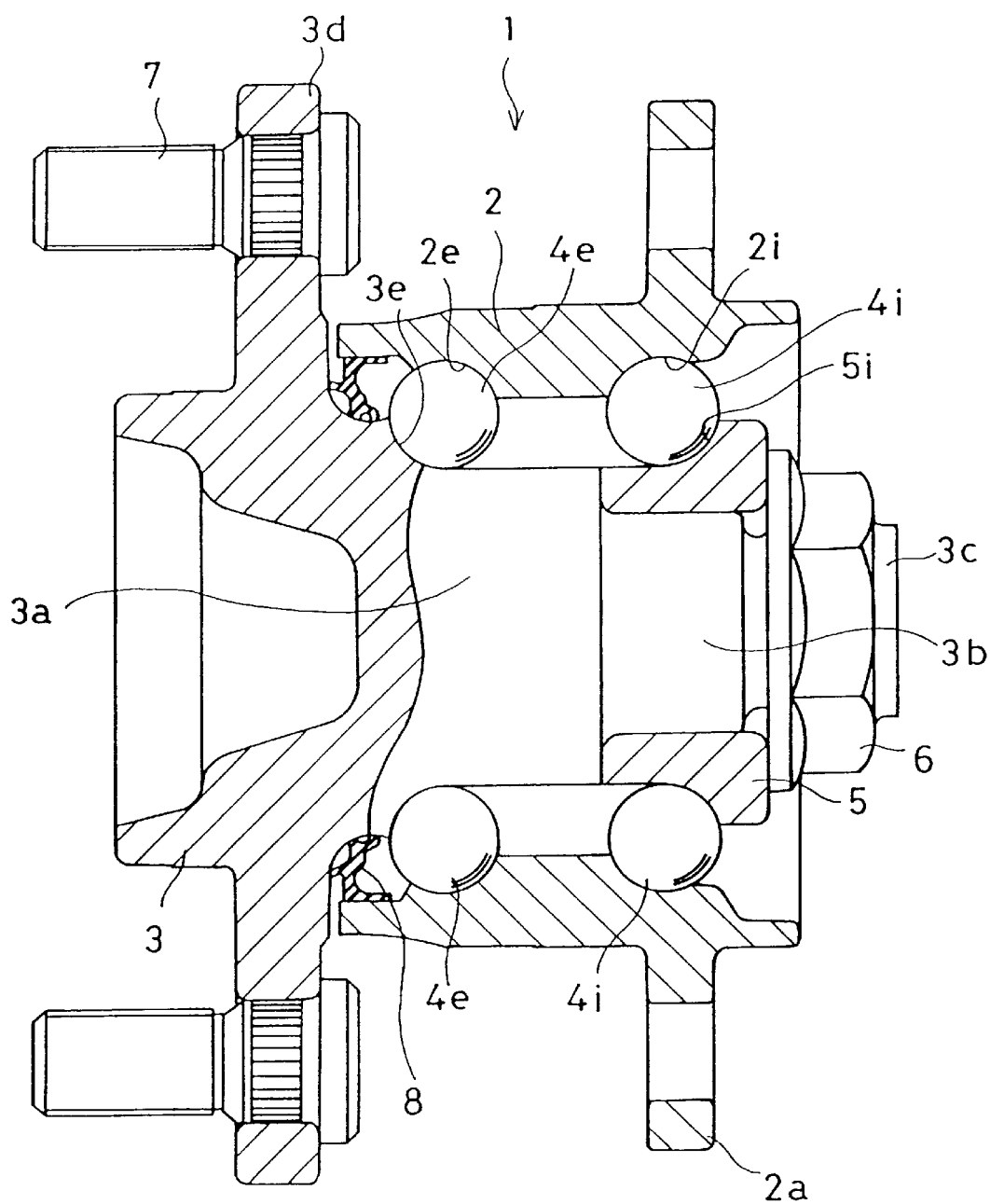
FIG. 5 is a cross-sectional view showing a double-row rolling bearing.

First, composition of a double-row rolling bearing will be described. FIG. 5 is a cross-sectional view showing a hub unit 1 composed of a double-row rolling bearing. This hub unit 1 is an apparatus for connecting a wheel to a suspension system of an automobile. In FIG. 5, a flange member 2a of an outer ring or first bearing member 2, which is a stationary element of the bearing, is fixed to the suspension system (not shown). A spindle member 3a of the bearing, which is a movable element of the bearing, is inserted to an inner part of the outer ring 2. The spindle member 3a is rotatably held by plural rollers 4e forming an external (left side in the figure) annular row and plural rollers 4i forming an internal (right side in the figure) annular row. Hereinafter, the rollers 4e are referred to as external rollers, and the rollers 4i are referred to as internal rollers. A part of the spindle member 3a, which faces the internal rollers 4i, is formed into a cylindrical member 3b having a diameter smaller than the other part. An end part of the spindle member 3a is a male screw 3c. An inner ring or third bearing number 5 is fixed on around the cylindrical member 3b, and a nut 6 is tightened with the male screw 3c.

The external rollers 4e are held by the outer ring 2 and the spindle member 3a. The external rollers 4e are capable of making rolling motion in a circular path defined by a first outer-ring track 2e formed in an inner face part of the outer ring 2 and a first inner-ring track 3e formed in an outer face part of the spindle member 3a. Also, the internal rollers 4i are held by the outer ring 2 and the inner ring 5. The internal rollers 4i are capable of making rolling motion in a circular path defined by a second outer-ring track 2i formed in an inner face part of the outer ring 2 and a second inner-ring track 5i formed in an outer face part of the inner ring 5. The hub or second bearing member 3 has in its periphery a flange member 3d to which plural bolts 7 are fixed. A wheel (not shown) is fixed to the hub 3 with the bolts 7 and nuts (not shown), and the wheel rotates together with the hub 3. A seal 8, which is made of an elastic material, is provided on an inner circumference of an end part (left side) of the outer ring 2. The seal 8 is in contact with the rotating hub 3 to thereby prevent invasion of water or alien substance into the internal part of the outer ring 2.

Figure 1:
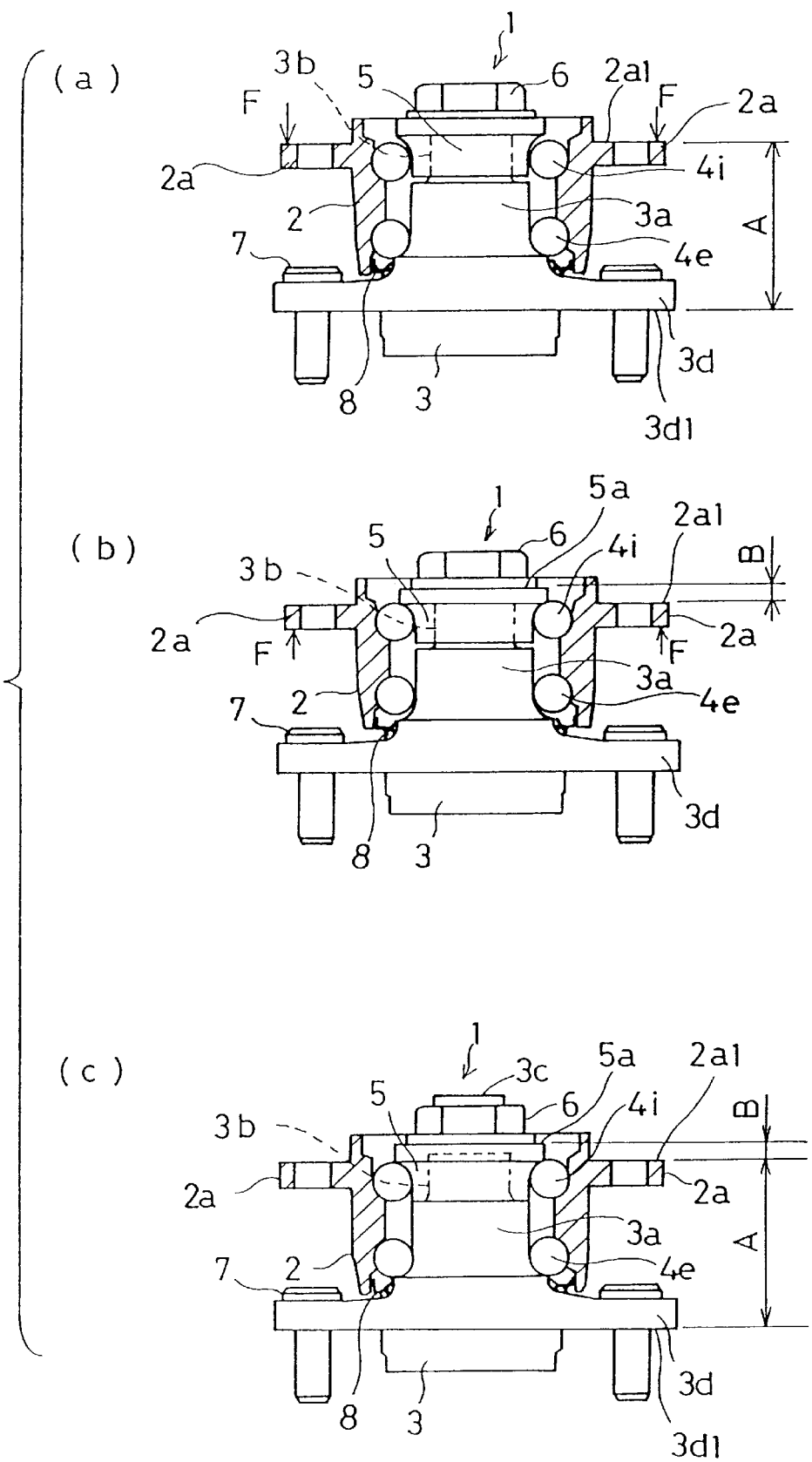
FIG. 1(a) is a cross-sectional view illustrating the initial step in a procedure for measuring a pre-load gap of a hub unit and a method for measuring a pre-load in a double-rolling bearing in the first embodiment of the present invention.
FIG. 1(b) is a cross-sectional view illustrating a subsequent step in procedure following the step illustrated in FIG. 1(a)
FIG. 1(c) is a cross-sectional view illustrating a step in the procedure subsequent to the step shown in FIG. 1(b) of the first embodiment of the present invention.

FIGS. 1(a), 1(b) and 1(c) illustrate in order plural serial steps performed in a first embodiment method for measuring a pre-load gap of the hub unit 1. The embodiment is based on a uniform relationship between a pre-load applied to the bearing and a pre-load gap which is a negative "gap" formed by elastic transformation of rollers in the bearing and some parts related to the rollers when a state of free of pre-load turns to a state that a pre-load is applied. It is therefore possible to equivalently measure a pre-load by measuring a pre-load gap. The state of free of pre-load is hereinafter referred to as a positive-gap state.

Hereafter, a method for measuring a pre-load gap in the hub unit 1 will be described.

In FIG. 1(a), the inner ring 5 is fitted slightly to a part of the cylindrical member 3b of the hub 3 with the nut 6 released to thereby keep the positive gap state. This is a pre-assembled state of the inner ring 5 to the hub 3. In this pre-assembled state, the flange member 2a of the outer ring 2 is impressed with a load F toward the outer side, in a downward direction as illustrated in FIG. 1(a) of an axial direction that is not so large to apply a pre-load to the external rollers 4e and the outer ring 2. In this state, a distance A is measured between a face 2a1 of axially inner side, in the upward direction as shown in FIG. 1(a), of the flange member 2a of the outer ring 2 and a face 3d1 of axially outer side of the flange member 3d of the hub 3.

Next, as shown in FIG. 1(d), the flange member 2a of the outer ring 2 is impressed with a load F toward the inner side of the axial direction that is not so large to apply a pre-load to the internal rollers 4i and the inner ring 5. In this state, a distance B is measured between the face 2a1 of axially inner side of the flange member 2a of the outer ring 2 and an inner end face 5a of the inner ring 5.

Next, as shown in FIG. 1(c), the nut 6 is tightened, and thereby the inner ring 5 is fitted thoroughly to the cylindrical member 3b of the hub 3, which is a state that a predetermined pre-load is applied. In this state, a distance A' is measured between the face 2a1 of axially inner side of the flange member 2a of the outer ring 2 and the face 3d1 of axially outer side of the flange member 3d of the hub 3. Also, a distance B' is measured between the face 2a1 of axially inner side of the flange member 2a of the outer ring 2 and the inner end face 5a of the inner ring 5.

In the above-mentioned measurement of respective distances, it is desirable to measure A, B, A' and B' plural times by rotating (e.g., 1/20 to 1 rotation) the outer ring 2 and obtain a mean value of them. This is because the measured value may be incorrect when an axis of the outer ring 2 slightly tilts against an axis of the hub 3 or the inner ring 5 (e.g., in a case there exists eccentricity between the axis of the stationary elements and the axis of the movable elements). Thus taking a mean value reduces an error and leads to a correct measured value.

Further, at the time immediately after the load F was applied to in FIG. 1(a) and FIG. 1(b) and at the time immediately after the pre-load was applied to in FIG. 1(c), the rollers 4e and 4i may not be aligned on the track of the inner ring 5 or the hub 3. In fact, the rollers 4e and 4i often shifts downward or upward. When the respective distances are measured under a condition that the rollers 4e and 4i are shifted, the measured value will be incorrect. It is therefore desirable to have a step for rotating the outer ring 2 or the hub 3 prior to the measurement of the above-mentioned respective distances. By rotating the inner ring 5 or the hub 3, the rollers 4e and 4i will be aligned on the track, and thereby a correct measured value can be obtained.

Based on distances A, A', B and B' thus obtained, a pre-load gap d is obtained by an equation:

$$d=(A-A')+(B-B') \qquad (1).$$

That is, a sum of a pre-load gap (A–A') of a row of the external rollers 4e and a pre-load gap (B–B') of a row of the internal rollers 4i is an entire pre-load gap d of the bearing. Under the condition that the pre-load is being applied, there exists no practical gap between the respective rollers 4e, 4i and the respective tracks (the outer-ring track 2e, 2i and the inner-ring tracks 3e, 5i in FIG. 1(a), FIG. 1(b) and FIG 1(c). A negative "gap" is formed by elastic transformation of respective parts which makes contact with each other, and a sum of negative gaps in the axial direction is the above-mentioned pre-load gap. When the pre-load gap thus obtained is within a value of a pre-load gap corresponding to the proper pre-load and its tolerance, the pre-load is suitable. If not, it is understood that the pre-load applied to the bearing is not proper.

According to the above-mentioned embodiment, the nut 6 is finally tightened in FIG. 1(c), and thereby the inner ring 5 is fitted thoroughly to the cylindrical member 3b of the hub 3. However, some types of the hub unit are delivered to a manufacturer of automobile without tightening the nut 6. In such case, the nut 6 will be tightened at the manufacturer of automobile.

Figure 2:
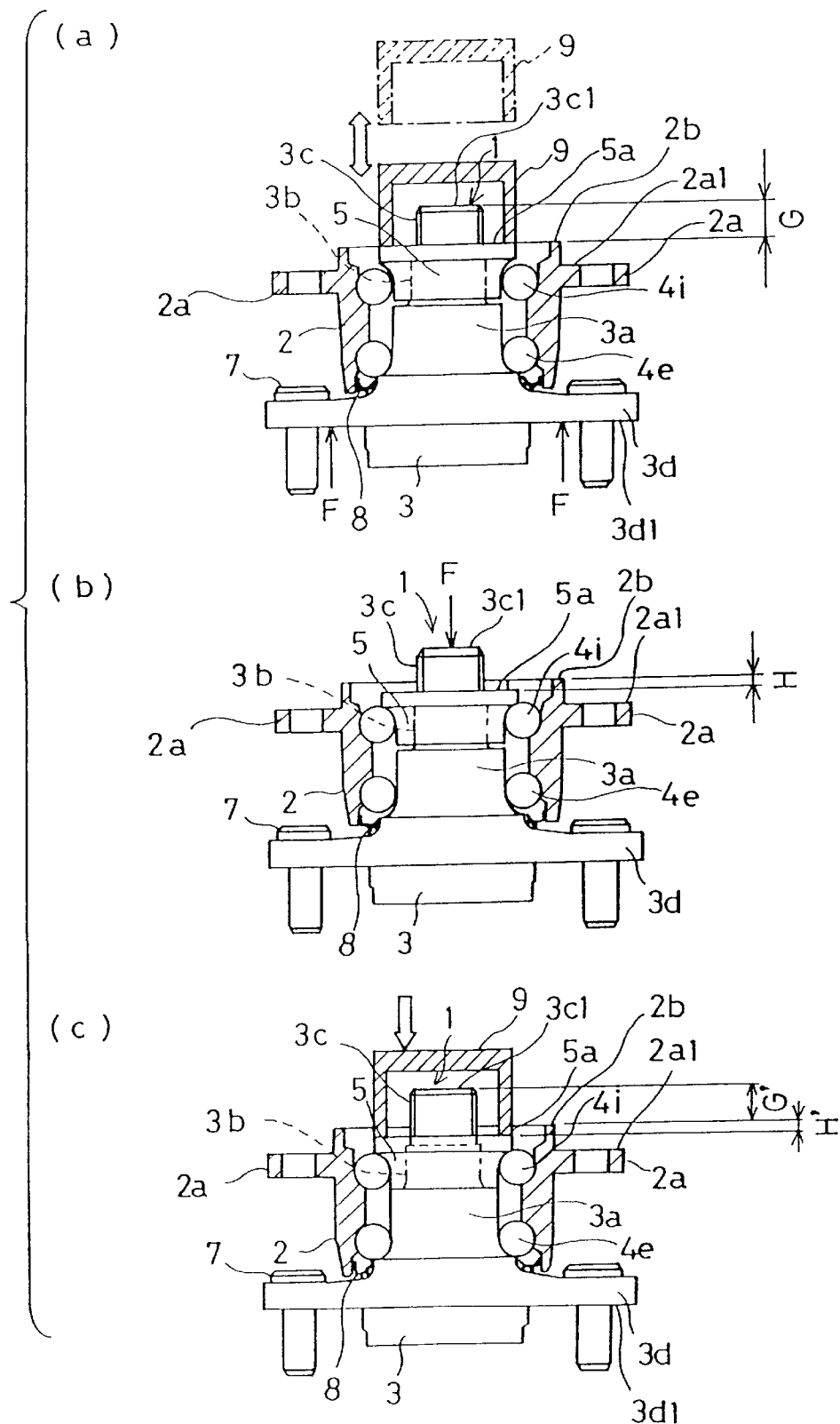
FIG. 2(a) is a cross-sectional view showing a procedure for measuring a pre-load gap of a hub unit in performance of a method for measuring a pre-load in a double-rolling bearing in the second embodiment of the present invention.
FIG. 2(b) is a cross-sectional view showing a subsequent step following the step illustrated in FIG. 2(a) of the second embodiment of the invention.
FIG. 2(c) is a cross-sectional view illustrating a subsequent step in the procedure of the second embodiment subsequent to the step shown in FIG. 2(b)

FIG. 2(a), FIG. 2(b) and FIG. 2(c) illustrate successive steps in the practice of the second method embodiment of the present invention without employment of nut 6. In this second embodiment, press fitting of the inner ring 5 for measuring a pre-load gap is carried out with a press-fitting tool 9 instead of the nut 6. The press-fitting tool 9 is arranged above the hub unit 1, and the press-fitting tool 9 is held movable in up and down directions. The press-fitting tool 9 is connected to a lower end of drive means (not shown) and is moved in up and down directions by the drive means. The drive means is required to be able to push and pull the press-fitting tool 9 with a strong force enough to carry out the press-fitting of the inner ring 5. Also, the drive means is required to be able to fine adjust position of the press-fitting tool 9 in the up and down direction. For example, an oil-hydraulic cylinder and a feed screw mechanism are available. The press-fitting tool 9 has a cylindrical cup shape, and a lower end part of aperture side is capable of abutting on the inner end face 5a of the inner ring 5.

Hereafter, a method for measuring a pre-load gap in the hub unit 1 of the second embodiment will be described.

In FIG. 2(a), the inner ring 5 is fitted slightly to the cylindrical member 3b of the hub 3 by the press-fitting tool 9 to thereby keep the positive gap state. This is a pre-assembled state of the inner ring 5 to the hub 3. Next, the press-fitting tool 9 is raised up to a position shown by chain lines to detach from the inner ring 5. Then, the face 3d1 of axially outer side of the flange member 3d is impressed with a load F toward the inner side in the upward direction as viewed in FIG. 2(a) of an axial direction that is not so large to apply a pre-load to the external rollers 4e and the outer ring 2. In this state, a distance G is measured between an end face 2b of axially inner side (upward) of the outer ring 2 and an end face 3c1 of the male screw 3c.

Next, as shown in FIG. 2(b), the end face 3c1 of the male screw 3c is impressed with a load F toward the outer side (downward) of the axial direction that is not so large to apply a pre-load to the internal rollers 4i and the inner ring 5. In this state, a distance H is measured between the end face 2b of the outer ring 2 and the inner end face 5a of the inner ring 5.

Next, as shown in FIG. 2(c), the press-fitting tool 9 is pushed onto the inner ring 5, and thereby the inner ring 5 is fitted thoroughly to the cylindrical member 3b of the hub 3, which is a state that a predetermined pre-load is applied. Thereafter, the press-fitting tool 9 is raised up, and then a distance G' is measured between the end face 2b of axially inner side of the outer ring 2 and the end face 3c1 of the male screw 3. Also, a distance H' is measured between the end face 2b of axially inner side of the outer ring 2 and the inner end face 5a of the inner ring 5.

According to the above-mentioned second embodiment, three reference faces are available to measure the distances. One is the end face 2b of axially inner side of the outer ring 2, and another is the inner end face 5a of the inner ring 5, and the other is the end face 3c1 of the male screw 3c. Since these three faces are finished very smooth through machining process, accuracy of measurement is high degree.

In the above-mentioned measurement of respective distances, it is desirable to measure G, H, G' and H' plural times by rotating the outer ring 2 or the hub 3 and obtain a mean value of them for the same reason as mentioned in the first embodiment. Also, it is desirable to have a step for rotating the outer ring 2 or the hub 3 prior to the measurement of the above-mentioned respective distances for the same reason as mentioned in the first embodiment.

Based on the distances G, G', H and H' thus obtained, a pre-load gap d is obtained by an equation:

$$d=(G'-G)+(H'-H) \qquad (2).$$

That is, a sum of a pre-load gap (G'–G) of a row of the external rollers 4e and a pre-load gap (H'–H) of a row of the internal rollers 4i is an entire pre-load gap d of the bearing.

In view of the above-mentioned two embodiments, it should be understood that the respective methods may be combined. That is, the method for measuring the pre-load d based on the distances G, H, G' and H' as described in the second embodiment is applicable to a case where the load F is applied to the outer ring 2 with the hub 3 being fixed as described in the first embodiment. Also, the method for measuring the pre-load d based on the distances A, B, A' and B' as described in the first embodiment is applicable to a case where the load F is applied to the hub 3 with the outer ring 2 being fixed as described in the second embodiment.

Figure 3:
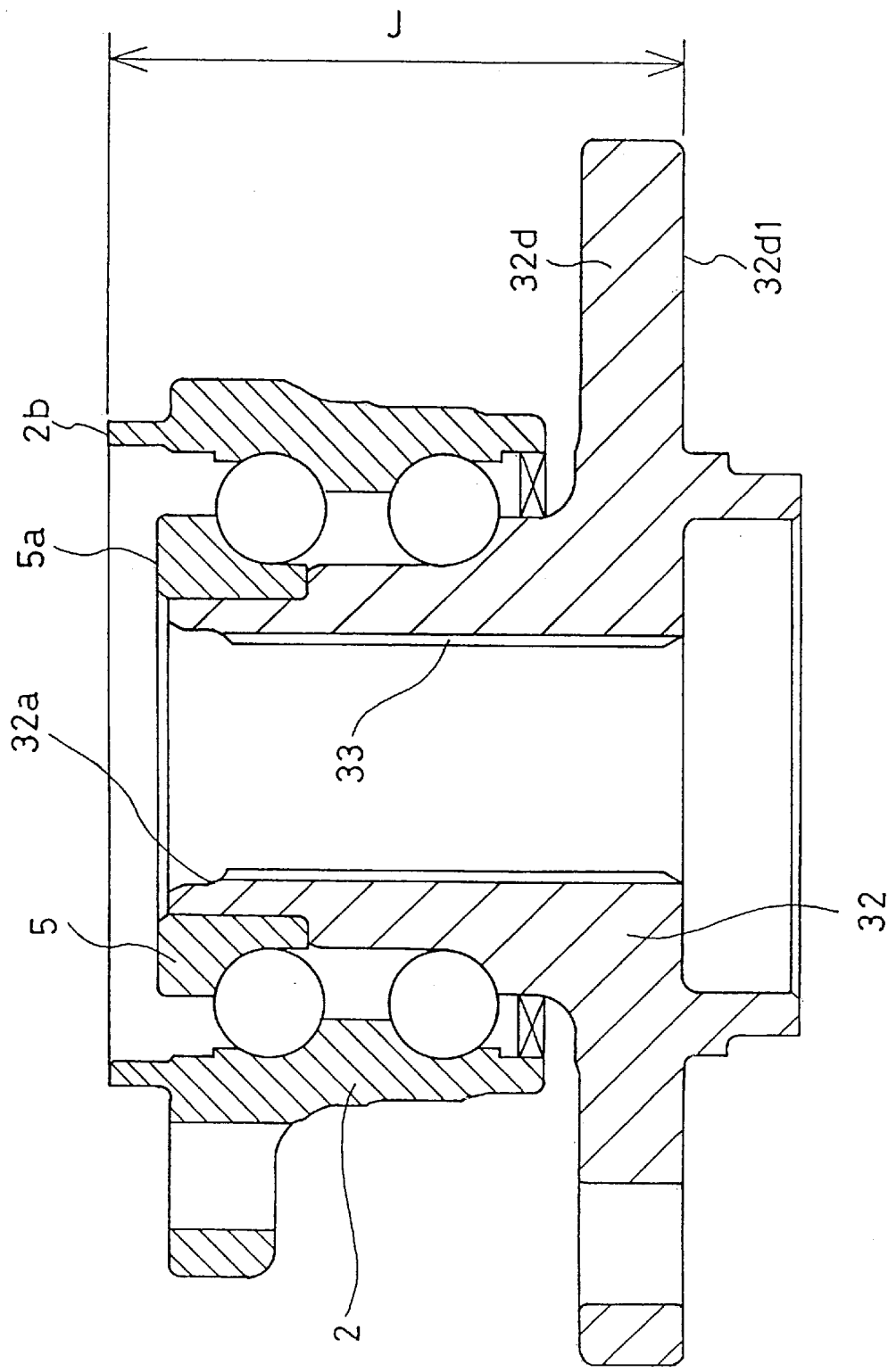
FIGS. 3(a), 3(b) and 3(c) are cross-sectional views.
Figure 3B:
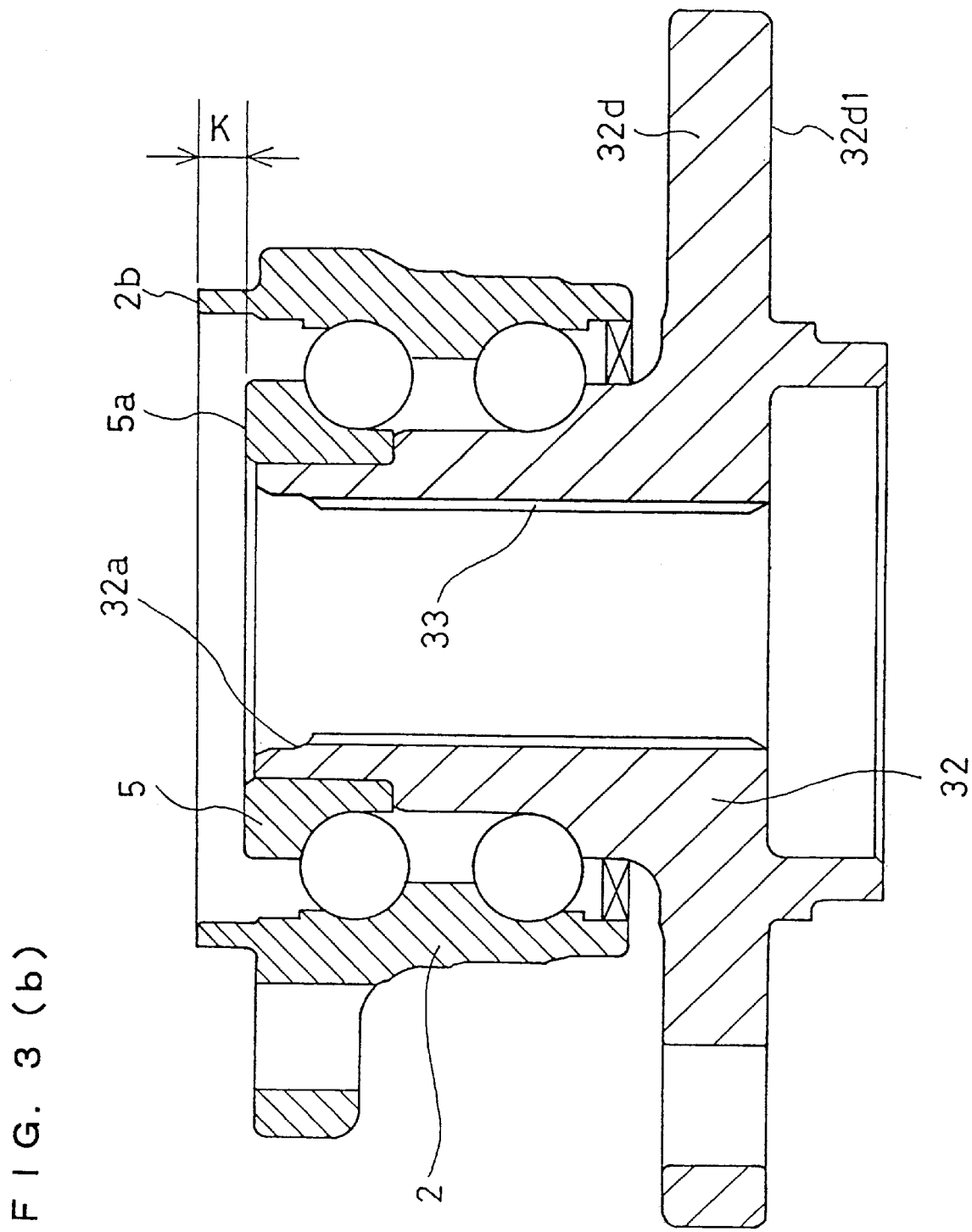

The above-mentioned method for measuring the pre-load gap d can be applied to another hub unit for a driving wheel which is connected to a drive shaft driven by an engine of automobile. FIGS. 3(a), 3(b) and 3(c) are cross-sectional views of the hub unit for the driving wheel. In FIG. 3(a), a spline hole 32a is formed at the center of the hub 3, and the spline hole 32a has many splines 33 formed on an internal face of the hub 32. A drive shaft (not shown) for transmitting a driving force from the engine is inserted into the spline hole 32a and engaged with the splines 33. In such hub unit, a pre-load gap d is obtained in the similar way to the first embodiment. As shown in FIGS. 3(a)–3(c) distances J and J' are respectively measured FIG. 3(a) before and after FIG. 3(c) press-fitting of the inner ring 5 between an end face 2b of axially inner side of the outer ring 2 and an end face 32d1 of axially outer side of an flange member 32d of the hub 32, and distances K and K' are respectively measured FIG. 3(b) before and after FIG. 3(c) press-insertion of the inner ring 5 between the end face 2b of axially inner side of the outer ring 2 and an inner end face 5a of the inner ring 5. Then, a pre-load gap d is obtained by an equation:

$$d=(J-J')+(K'-K) \tag{3}$$

Figure 4:
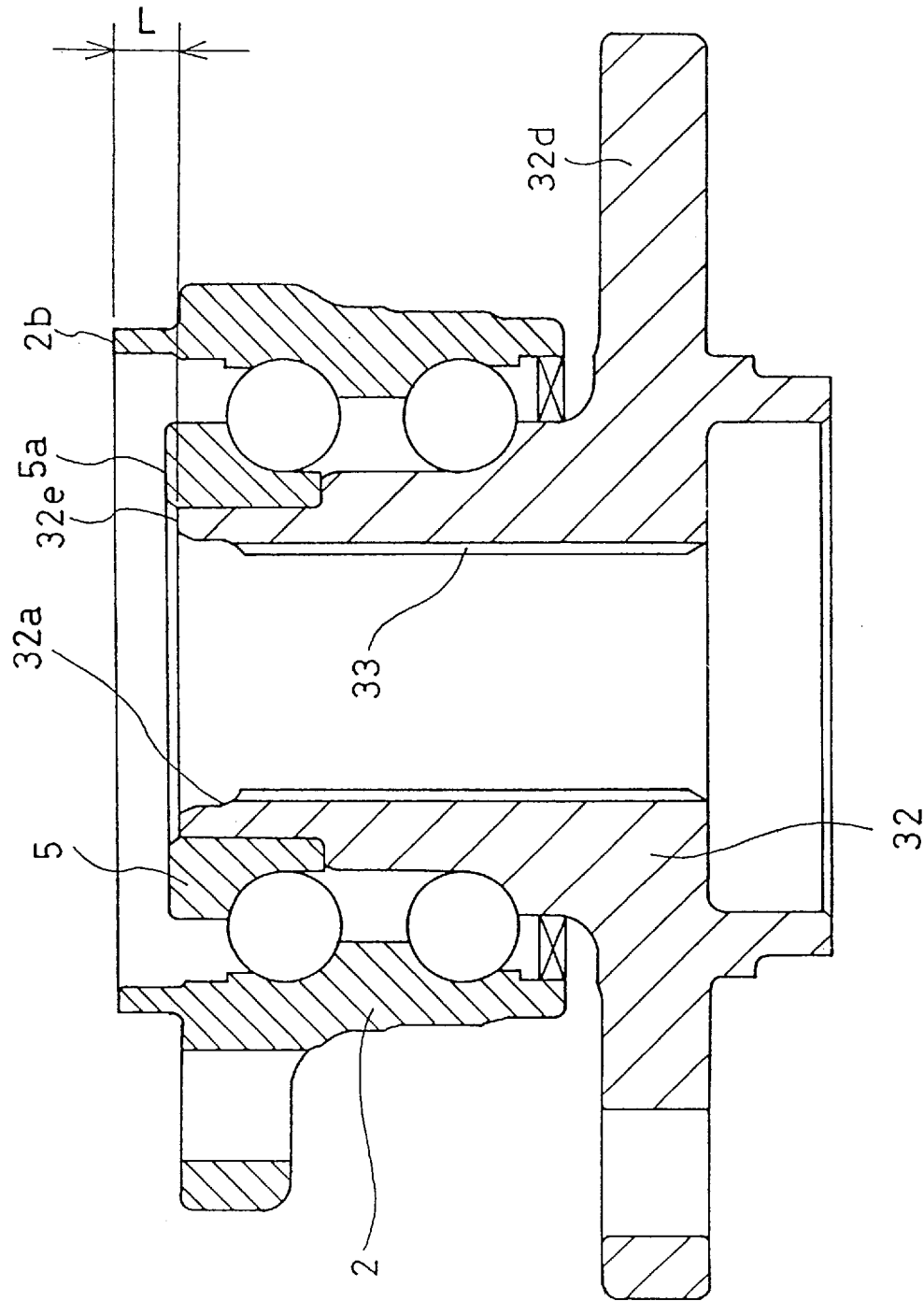
FIGS. 4(a), 4(b) and 4(c) show the hub unit as shown in FIGS. 3(a), 3(b) and 3(c)
Figure 4:
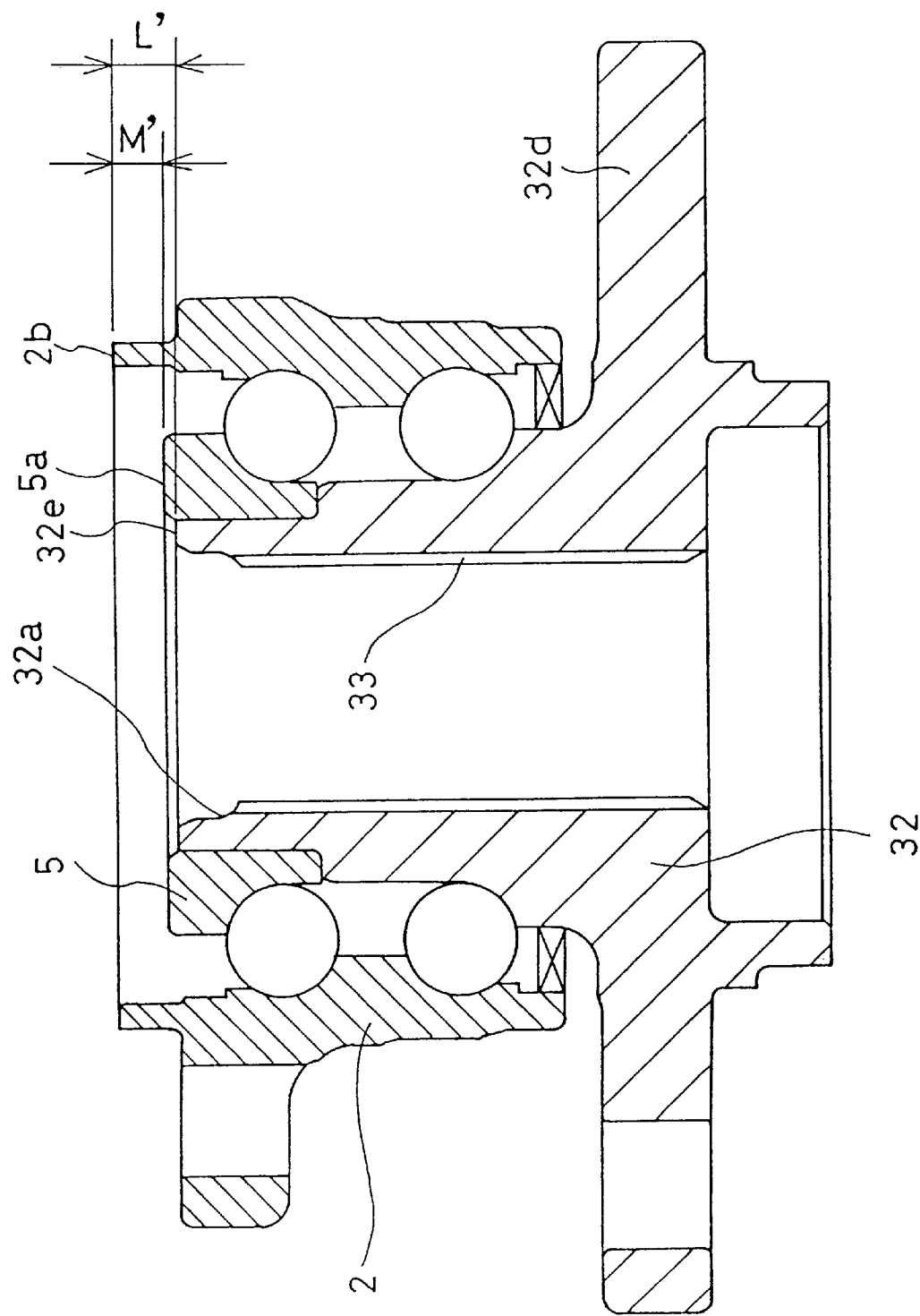

Furthermore, a pre-load gap d may be obtained in the similar way to the second embodiment. As shown in FIGS. 4(a), 4(b) and 4(c), distances L and L' are respectively measured before FIG. 4(a) and after FIG. 4(c) press-fitting of the inner ring 5 between the end face 2b of axially inner side of the outer ring 2 and an end face 32e of axially inner side of the hub 32, and distances M and M' are respectively measured before FIG. 4(b) and after FIG. 4(c) press-insertion of the inner ring 5 between the end face 2b of axially inner side of the outer ring 2 and an inner end face 5a of the inner ring 5. Then, a pre-load gap d is obtained by an equation:

$$d=(L-L')+(M'-M) \tag{4}$$

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. For use with a rolling bearing comprising plural rollers arranged in a first row and plural rollers arranged in a second row so as to form a double row of rollers, first, second, and third bearing members, first and second tracks formed respectively in said first and second bearing members so as to define a first path for said first row of plural rollers, and third and fourth tracks formed respectively in said first and third bearing members so as to define a second path for said second row of plural rollers, with said first and second paths forming a double row of tracks, a method for measuring a pre-load applied to said rolling bearing by measuring a pre-load gap in said bearing, said method comprising the steps of:

measuring a first pre-load gap for said first row of plural rollers and said first path, said first pre-load gap being defined by a variation in distance between said first and second bearing members before and after applying said pre-load to said bearing;

measuring a second pre-load gap for said second row of plural rollers and said second path, said second pre-load gap being defined by a variation in distance between said first and third bearing members before and after applying said pre-load to said bearing; and adding said first pre-load gap and said second pre-load gap together to thereby obtain an entire pre-load gap of said bearing.

* * * * *